(12) United States Patent
Xie

(10) Patent No.: US 10,214,427 B2
(45) Date of Patent: Feb. 26, 2019

(54) MOLECULAR SIEVE SSZ-109, ITS SYNTHESIS AND USE

(71) Applicant: Chevron U.S.A. Inc., San Ramon, CA (US)

(72) Inventor: Dan Xie, Richmond, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 0 days.

(21) Appl. No.: 15/951,255

(22) Filed: Apr. 12, 2018

(65) Prior Publication Data

US 2018/0312408 A1 Nov. 1, 2018

Related U.S. Application Data

(60) Provisional application No. 62/491,437, filed on Apr. 28, 2017.

(51) Int. Cl.

| | |
|---|---|
| *C01B 39/48* | (2006.01) |
| *B01J 29/70* | (2006.01) |
| *B01J 20/18* | (2006.01) |
| *B01J 20/30* | (2006.01) |
| *B01J 37/00* | (2006.01) |

(Continued)

(52) U.S. Cl.
CPC .............. *C01B 39/48* (2013.01); *B01J 20/18* (2013.01); *B01J 20/3057* (2013.01); *B01J 20/3085* (2013.01); *B01J 29/70* (2013.01); *B01J 29/86* (2013.01); *B01J 29/87* (2013.01); *B01J 29/88* (2013.01); *B01J 37/0018* (2013.01); *B01J 37/04* (2013.01); *C01B 37/02* (2013.01); *C01B 39/06* (2013.01); *C01B 39/065* (2013.01); *C01B 39/08* (2013.01); *C01B 39/082* (2013.01); *C01B 39/087* (2013.01); *C01B 39/12* (2013.01); *C01P 2002/72* (2013.01)

(58) Field of Classification Search
CPC ....... C01B 39/06; C01B 39/065; C01B 39/08; C01B 39/082; C01B 39/087; C01B 39/12; C01B 39/48; C01P 2002/72; B01J 20/18; B01J 29/707; B01J 29/86; B01J 29/87; B01J 29/88

See application file for complete search history.

(56) References Cited

U.S. PATENT DOCUMENTS

| 8,361,435 B2 | 1/2013 | Fecant et al. |
| 8,936,717 B2 | 1/2015 | Guillon et al. |

(Continued)

FOREIGN PATENT DOCUMENTS

| EP | 0142317 A2 | 5/1985 |
| WO | 2009038740 A2 | 3/2009 |
| WO | 2017044365 A1 | 3/2017 |

OTHER PUBLICATIONS

PCT International Search Report, International Patent Appl. No. PCT/IB2018/052550, dated Jun. 19, 2018.

*Primary Examiner* — David M Brunsman
(74) *Attorney, Agent, or Firm* — Terrence M. Flaherty

(57) ABSTRACT

A novel synthetic crystalline molecular sieve designated as SSZ-109 is disclosed. SSZ-109 is synthesized using a structure directing agent comprising one or more of N,N,N',N'-tetramethyl-N,N'-diisobutylhexane-1,6-diammonium cations, N,N,N',N'-tetramethyl-N,N'-dineopentylhexane-1,6-diammonium cations, and N,N,N',N'-tetramethyl-N-isobutyl-N'-neopentylhexane-1,6-diammonium cations.

15 Claims, 3 Drawing Sheets

(51) Int. Cl.
*B01J 37/04* (2006.01)
*C01B 39/06* (2006.01)
*B01J 29/88* (2006.01)
*C01B 39/08* (2006.01)
*B01J 29/87* (2006.01)
*B01J 29/86* (2006.01)
*C01B 37/02* (2006.01)
*C01B 39/12* (2006.01)

(56) References Cited

U.S. PATENT DOCUMENTS

2009/0076317 A1* 3/2009 Lai ......................... B01J 29/703
    585/852
2017/0073240 A1* 3/2017 Xie ....................... C01B 39/305
2018/0099875 A1 4/2018 Mowat et al.
2018/0354808 A1* 12/2018 Xie ......................... C01B 39/48

\* cited by examiner

MOLECULAR SIEVE SSZ-109, ITS SYNTHESIS AND USE

CROSS-REFERENCE TO RELATED APPLICATIONS

This application claims priority to U.S. Provisional Application Ser. No. 62/491,437, filed on Apr. 28, 2017, which is herein incorporated by reference in its entirety.

TECHNICAL FIELD

This disclosure relates to a novel synthetic crystalline molecular sieve designated SSZ-109, its synthesis, and its use in adsorption and catalytic processes.

BACKGROUND

Molecular sieve materials, both natural and synthetic, have been demonstrated in the past to be useful as adsorbents and to have catalytic properties for various types of organic conversion reactions. Certain molecular sieves, such as zeolites, aluminophosphates, and mesoporous materials, are ordered, porous crystalline materials having a definite crystalline structure as determined by X-ray diffraction. Within the crystalline molecular sieve material there are a large number of cavities which may be interconnected by a number of channels or pores. These cavities and pores are uniform in size within a specific molecular sieve material. Because the dimensions of these pores are such as to accept for adsorption molecules of certain dimensions while rejecting those of larger dimensions, these materials have come to be known as "molecular sieves" and are utilized in a variety of industrial processes.

Although many different crystalline molecular sieves have been discovered, there is a continuing need for new molecular sieves with desirable properties for gas separation and drying, organic conversion reactions, and other applications.

According to the present disclosure, a new molecular sieve, designated SSZ-109 and having a unique powder X-ray diffraction pattern, has now been synthesized using a structure directing agent comprising one or more of N,N,N',N'-tetramethyl-N,N'-diisobutylhexane-1,6-diammonium cations, N,N,N',N'-tetramethyl-N,N'-dineopentylhexane-1,6-diammonium cations, and N,N,N',N'-tetramethyl-N-isobutyl-N'-neopentylhexane-1,6-diammonium cations.

SUMMARY

Described herein is a novel crystalline molecular sieve material designated SSZ-109, its synthesis in the presence of a structure directing agent, and its use (e.g., as an adsorbent and as a catalyst for organic conversion reactions).

In one aspect, there is provided a molecular sieve having, in its as-synthesized form, an X-ray diffraction pattern including the peaks listed in Table 2.

In its as-synthesized and anhydrous form, the molecular sieve has a chemical composition comprising the following molar relationship:

|  | Broad | Exemplary |
|---|---|---|
| SiO$_2$/X$_2$O$_3$ | ≥10 | 20 to 500 |
| Q/SiO$_2$ | >0 to 0.1 | >0 to 0.1 |
| M/SiO$_2$ | 0 to 0.1 | >0 to 0.1 | wherein X is a trivalent element (e.g., one or more of B, Al, Ga, and Fe); Q comprises one or more of N,N,N',N'-tetramethyl-N,N'-diisobutylhexane-1,6-diammonium cations, N,N,N',N'-tetramethyl-N,N'-dineopentylhexane-1,6-diammonium cations, and N,N,N',N'-tetramethyl-N-isobutyl-N'-neopentylhexane-1,6-diammonium cations; and M is a metal selected from Groups 1 and 2 of the Periodic Table of Elements.

In another aspect, there is provided a molecular sieve having, in its calcined form, an X-ray diffraction pattern including the peaks listed in Table 3.

In its calcined form, the molecular sieve has a chemical composition comprising the following molar relationship:

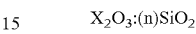

wherein X is a trivalent element (e.g., one or more of B, Al, Ga, and Fe) and n is at least 10.

In a further aspect, there is provided a method of synthesizing the molecular sieve described herein, the method comprising (a) preparing a reaction mixture comprising: (1) a source of silicon oxide; (2) optionally, a source of an oxide of a trivalent element; (3) optionally, a source of a metal selected from Groups 1 and 2 of the Periodic Table of Elements; (4) a source of a structure directing agent comprising one or more of N,N,N',N'-tetramethyl-N,N'-diisobutylhexane-1,6-diammonium cations, N,N,N',N'-tetramethyl-N,N'-dineopentylhexane-1,6-diammonium cations, and N,N,N',N'-tetramethyl-N-isobutyl-N'-neopentylhexane-1,6-diammonium cations; (5) a source of hydroxide ions; and (6) water; and (b) subjecting the reaction mixture to crystallization conditions sufficient to form crystals of the molecular sieve.

In yet a further aspect, there is provided a process of converting a feedstock comprising an organic compound to a conversion product which comprises contacting the feedstock at organic compound conversion conditions with a catalyst comprising an active form of the molecular sieve described herein.

DETAILED DESCRIPTION

Introduction

Figure 1:
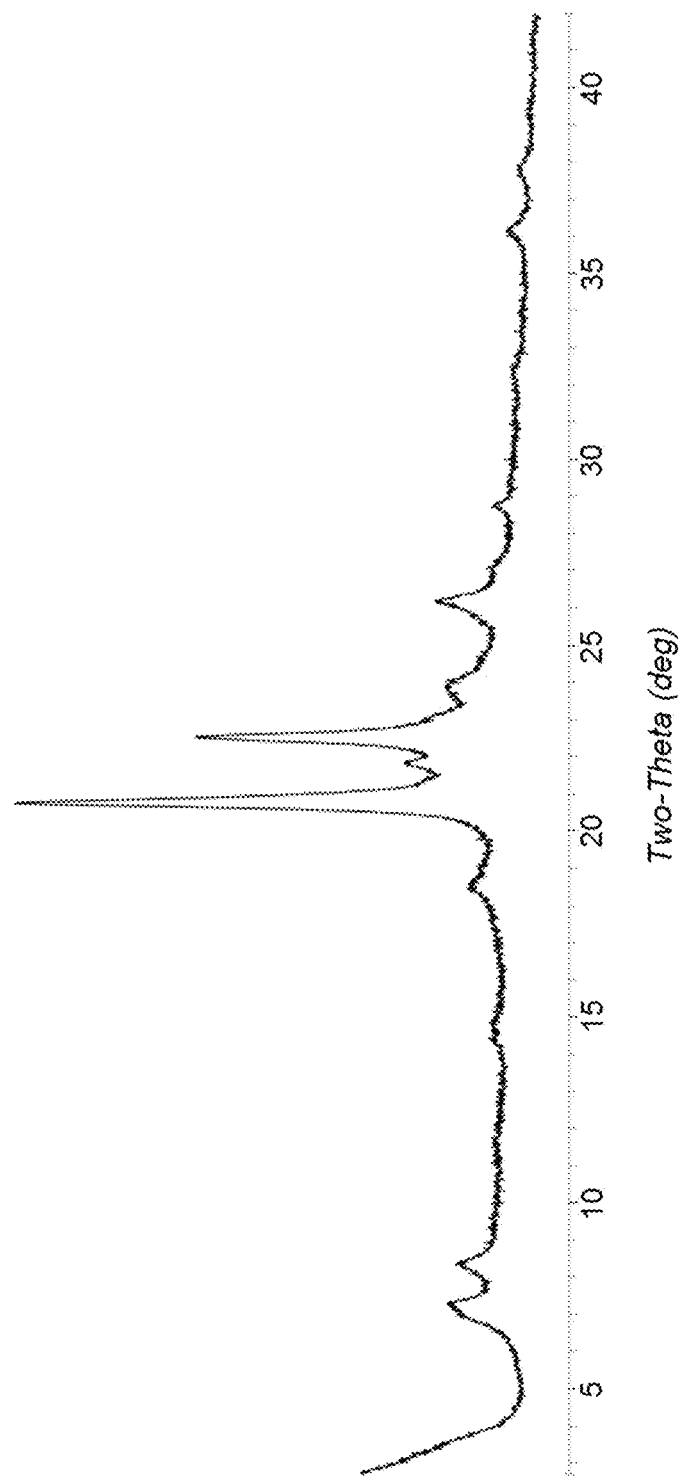
FIG. 1 shows the powder X-ray diffraction (XRD) pattern of the as-synthesized molecular sieve of Example 1.

The term "as-synthesized" is employed herein to refer to a molecular sieve in its form after crystallization, prior to removal of the structure directing agent.

The term "anhydrous" is employed herein to refer to a molecular sieve substantially devoid of both physically adsorbed and chemically adsorbed water.

As used herein, the numbering scheme for the Periodic Table Groups is as disclosed in Chem. Eng. News 1985, 63(5), 26-27.

Reaction Mixture

In general, molecular sieve SSZ-109 is synthesized by: (a) preparing a reaction mixture comprising (1) a source of silicon oxide; (2) optionally, a source of an oxide of a trivalent element (X); (3) optionally, a source of a metal (M) selected from Groups 1 and 2 of the Periodic Table of Elements; (4) a source of a structure directing agent (Q)

comprising one or more of N,N,N',N'-tetramethyl-N,N'-diisobutylhexane-1,6-diammonium cations, N,N,N',N'-tetramethyl-N,N'-dineopentylhexane-1,6-diammonium cations, and N,N,N',N'-tetramethyl-N-isobutyl-N'-neopentylhexane-1,6-diammonium cations; (5) a source of hydroxide ions; and (6) water; and (b) subjecting the reaction mixture to crystallization conditions sufficient to form crystals of the molecular sieve.

The composition of the reaction mixture from which the molecular sieve is formed, in terms of molar ratios, is identified in Table 1 below:

TABLE 1

| Reactants | Broad | Exemplary |
| --- | --- | --- |
| $SiO_2/X_2O_3$ | ≥10 | 20 to 500 |
| $M/SiO_2$ | 0 to 0.5 | 0.01 to 0.20 |
| $Q/SiO_2$ | 0.05 to 0.50 | 0.10 to 0.25 |
| $OH/SiO_2$ | 0.01 to 0.60 | 0.20 to 0.40 |
| $H_2O/SiO_2$ | 5 to 60 | 20 to 40 |

Suitable sources of silicon oxide include colloidal silica, fumed silica, precipitated silica, alkali metal silicates and tetraalkyl orthosilicates.

If present, suitable sources of trivalent element X depend on the element X that is selected (e.g., boron, aluminum, gallium, and iron). In embodiments where X is boron, suitable sources of boron include boric acid and water-soluble borate salts (e.g., sodium borate). In embodiments where X is aluminum, suitable sources of aluminum oxide include hydrated alumina and water-soluble aluminum salts (e.g., aluminum nitrate).

Combined sources of Si and X can additionally or alternatively be used and can include, for example, aluminosilicate zeolites (e.g., zeolite Y) and clays or treated clays (e.g., metakaolin).

If present, suitable Group 1 or Group 2 metals (M) include sodium, potassium and calcium. The metal is generally present in the reaction mixture as the hydroxide.

The structure directing agent (Q) comprises one or more of N,N,N',N'-tetramethyl-N,N'-diisobutylhexane-1,6-diammonium cations (a C6 diquat of N,N-dimethyl isobutylamine), N,N,N',N'-tetramethyl-N,N'-dineopentylhexane-1,6-diammonium cations (a C6 diquat of N,N-dimethyl neopentylamine), and N,N,N',N'-tetramethyl-N-isobutyl-N'-neopentylhexane-1,6-diammonium cations, which are represented by the following structures (1), (2), and (3) respectively:

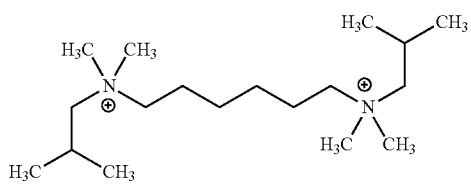

N,N,N',N'–tetramethyl-N,N'-diisobutylhexane-1,6-diammonium cation

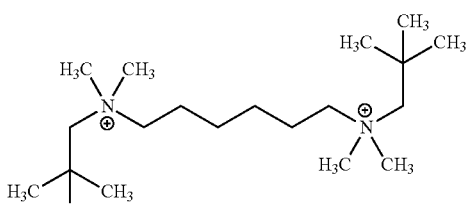

N,N,N',N'–tetramethyl-N,N'-dineopentylhexane-1,6-diammonium cation

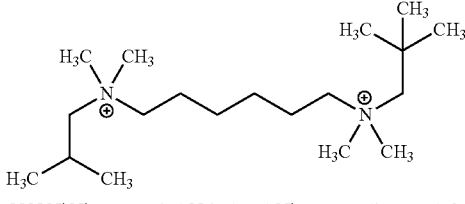

N,N,N',N'–tetramethyl-N-isobutyl-N'-neopentylhexane-1,6-diammonium cation

The diquaternary ammonium compounds (1) and (2) can be synthesized by a reaction of a 1,6-dihalohexane (e.g., 1,6-dibromohexane or 1,6-diodohexane) with N,N-dimethyl isobutylamine and N,N-dimethyl neopentylamine, respectively. The diquaternary ammonium compound (3) can be synthesized by a reaction of a 1,6-dihalohexane with a mixture of N,N-dimethyl isobutylamine and N,N-dimethyl neopentylamine.

Suitable sources of Q are the hydroxides, chlorides, bromides, and/or other salts of the diquaternary ammonium compounds.

The source of hydroxide ions may be a Group 1 metal hydroxide such as sodium hydroxide or potassium hydroxide. Hydroxide can also be present as a counter ion of the structure directing agent or by using aluminum hydroxide as a source of aluminum.

The reaction mixture may contain seeds of a molecular sieve material, such as SSZ-109 from a previous synthesis, in an amount of from 0.01 to 10,000 ppm by weight (e.g., 100 to 5000 ppm by weight) of the reaction mixture.

For each embodiment described herein, the molecular sieve reaction mixture can be supplied by more than one source. Also, two or more reaction components can be provided by one source.

The reaction mixture can be prepared either batch wise or continuously. Crystal size, morphology and crystallization time of the molecular sieve described herein can vary with the nature of the reaction mixture and the crystallization conditions.

Crystallization and Post-Synthesis Treatment

Crystallization of the molecular sieve from the above reaction mixture can be carried out under either static, tumbled or stirred conditions in a suitable reactor vessel, such as polypropylene jars or Teflon-lined or stainless steel autoclaves, at a temperature of from 125° C. to 200° C. for a time sufficient for crystallization to occur at the temperature used, e.g., from 5 to 20 days. Crystallization is usually carried out in a closed system under autogenous pressure.

Once the molecular sieve crystals have formed, the solid product is recovered from the reaction mixture by standard mechanical separation techniques such as centrifugation or filtration. The crystals are water-washed and then dried to obtain the as-synthesized molecular sieve crystals. The drying step is typically performed at a temperature of less than 200° C.

As a result of the crystallization process, the recovered crystalline molecular sieve product contains within its pore structure at least a portion of the structure directing agent used in the synthesis.

The molecular sieve described herein may be subjected to subsequent treatment to remove part or all of the structure directing agent used in its synthesis. This can be conveniently effected by thermal treatment in which the as-synthesized material can be heated at a temperature of at least 370° C. for at least 1 minute and not longer than 24 hours. The thermal treatment can be performed at a temperature up to 925° C. While sub-atmospheric and/or super-atmospheric pressures can be employed for the thermal treatment, atmospheric pressure may typically be desired for reasons of convenience. Additionally or alternatively, the structure directing agent can be removed by treatment with ozone (see, e.g., A.N. Parikh et al., Micropor. Mesopor. Mater. 2004, 76, 17-22). The organic-free product, especially in its metal, hydrogen and ammonium forms, is particularly useful in the catalysis of certain organic (e.g., hydrocarbon) conversion reactions. In the present disclosure, the organic-free molecular sieve in its hydrogen form is referred to as "active form" of the molecular sieve, with or without metal function present.

To the extent desired and depending on the $SiO_2/X_2O_3$ molar ratio, any Group 1 or Group 2 metal cations in the molecular sieve can be replaced in accordance with techniques well known in the art by ion exchange with other cations. Preferred replacing cations include metal ions, hydrogen ions, hydrogen precursor (e.g., ammonium) ions and mixtures thereof. Particularly preferred replacing cations are those which tailor the catalytic activity for certain organic conversion reactions. These include hydrogen, rare earth metals and metals of Groups 2 to 15 of the Periodic Table of the Elements.

Characterization of the Molecular Sieve

In its as-synthesized and anhydrous form, the molecular sieve SSZ-109 has a chemical composition comprising the following molar relationship:

|  | Broad | Exemplary |
|---|---|---|
| $SiO_2/X_2O_3$ | ≥10 | 20 to 500 |
| Q/SiO$_2$ | >0 to 0.1 | >0 to 0.1 |
| M/SiO$_2$ | 0 to 0.1 | >0 to 0.1 | wherein compositional variables X, Q and M are as described herein above.

It should be noted that the as-synthesized form of the present molecular sieve may have molar ratios different from the molar ratios of reactants of the reaction mixture used to prepare the as-synthesized form. This result may occur due to incomplete incorporation of 100% of the reactants of the reaction mixture into the crystals formed (from the reaction mixture).

In its calcined form, molecular sieve SSZ-109 has a chemical composition comprising the following molar relationship:

$X_2O_3$: (n)$SiO_2$ wherein X is a trivalent element (e.g., one or more of B, Al, Ga, and Fe) and n has a value of at least 10 (e.g., 10 to 1000, 10 to 500, 15 to 1000, 15 to 500, 20 to 1000, 20 to 500, 25 to 1000, or 25 to 500). It will be appreciated from the permitted values for n that SSZ-109 can be synthesized in a totally siliceous ("all-silica") form in which the trivalent element X is absent or essentially absent.

The as-synthesized and calcined forms of SSZ-109 have characteristic X-ray diffraction patterns, which in the as-synthesized form of the molecular sieve, includes at least the lines listed in Table 2 below and which, in the calcined form of the molecular sieve, includes at least the peaks listed in Table 3 below.

TABLE 2

Characteristic Peaks for As-Synthesized SSZ-109

| 2-Theta[a] | d-Spacing, nm | Relative Intensity[b] | Peak Broadening[c] |
|---|---|---|---|
| 7.29 | 1.212 | W | B |
| 8.36 | 1.056 | W | Sh |
| 14.71 | 0.602 | W | B |
| 18.45 | 0.480 | W | B |
| 20.74 | 0.428 | VS | Sh |
| 21.82 | 0.407 | W | Sh |
| 22.53 | 0.394 | VS | Sh |
| 23.92 | 0.372 | W | B |
| 26.17 | 0.340 | M | B |
| 28.71 | 0.311 | W | Sh |

[a]±0.30 degrees
[b]The powder X-ray diffraction patterns provided are based on a relative intensity scale in which the strongest line in the X-ray diffraction pattern is assigned a value of 100: W = weak (>0 to ≤20); M = medium (>20 to ≤40); S = strong (>40 to ≤60); VS = very strong (>60 to ≤100).
[c]Peak Broadening is characterized by the Full-Width at Half Maximum (FWHM) of the XRD peak. Based on the FWHM values, the peaks are classified as: Sh = sharp (≤1.5* smallest FWHM); B = broad (>1.5*smallest FWHM). Peak broadening may be contributed from structural disorder and/or overlapping of reflections having close d-spacing values.

TABLE 3

Characteristic Peaks for Calcined SSZ-109

| 2-Theta[a] | d-Spacing, nm | Relative Intensity[b] | Peak Broadening[c] |
|---|---|---|---|
| 7.21 | 1.225 | M | B |
| 8.43 | 1.048 | W | Sh |
| 14.54 | 0.609 | W | B |
| 18.62 | 0.476 | W | B |
| 20.80 | 0.427 | VS | Sh |
| 21.90 | 0.405 | W | Sh |
| 22.74 | 0.391 | M | Sh |
| 24.02 | 0.370 | W | B |
| 26.34 | 0.338 | M | B |
| 29.01 | 0.308 | W | B |

[a]±0.30 degrees
[b]The powder X-ray diffraction patterns provided are based on a relative intensity scale in which the strongest line in the X-ray diffraction pattern is assigned a value of 100: W = weak (>0 to ≤20); M = medium (>20 to ≤40); S = strong (>40 to ≤60); VS = very strong (>60 to ≤100).
[c]Peak Broadening is characterized by the Full-Width at Half Maximum (FWHM) of the XRD peak. Based on the FWHM values, the peaks are classified as: Sh = sharp (≤1.5* smallest FWHM); B = broad (>1.5*smallest FWHM). Peak broadening may be contributed from structural disorder and/or overlapping of reflections having close d-spacing values.

The powder X-ray diffraction patterns presented herein were collected by standard techniques. The radiation was CuKa radiation. The peak heights and the positions, as a function of 2θ where θ is the Bragg angle, were read from the relative intensities of the peaks (adjusting for background), and d, the interplanar spacing corresponding to the recorded lines, can be calculated.

Minor variations in the diffraction pattern can result from variations in the mole ratios of the framework species of the sample due to changes in lattice constants. In addition, sufficiently disordered materials and/or small crystals will affect the shape and intensity of peaks, leading to significant peak broadening. Minor variations in the diffraction pattern can also result from variations in the organic compound used in the preparation. Calcination can also cause minor shifts in the XRD pattern. Notwithstanding these minor perturbations, the basic crystal lattice structure remains unchanged.

Adorption and Catalysis

Molecular sieve SSZ-109 can be used as an adsorbent or, particularly in its aluminosilicate form, as a catalyst to catalyze a wide variety of organic compound conversion processes including many of present commercial/industrial importance. Examples of chemical conversion processes which are effectively catalyzed by SSZ-109, by itself or in combination with one or more other catalytically active substances including other crystalline catalysts, include those requiring a catalyst with acid activity. Organic conversion processes include, for example, cracking, hydrocracking, reforming, aromatization, oligomerization, isomerization, dewaxing, and alkylation, transalkylation, disproportionation, or isomerization of aromatics.

As in the case of many catalysts, it may be desirable to incorporate SSZ-109 with another material resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring, or in the form of gelatinous precipitates or gels, including mixtures of silica and metal oxides. Use of a material in conjunction with SSZ-109 (i.e., combined therewith or present during synthesis of the new material) which is active, tends to change the conversion and/or selectivity of the catalyst in certain organic conversion processes. Inactive materials suitably serve as diluents to control the amount of conversion in a given process so that products can be obtained in an economic and orderly manner without employing other means for controlling the rate of reaction. These materials may be incorporated into naturally occurring clays (e.g., bentonite and kaolin) to improve the crush strength of the catalyst under commercial operating conditions. These materials (i.e., clays, oxides, etc.) function as binders for the catalyst. It is desirable to provide a catalyst having good crush strength because in commercial use it is desirable to prevent the catalyst from breaking down into powder-like materials. These clay and/or oxide binders have been employed normally only for the purpose of improving the crush strength of the catalyst.

Naturally occurring clays which can be composited with SSZ-109 include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with SSZ-109 also include inorganic oxides, such as silica, zirconia, titania, magnesia, beryllia, alumina, and mixtures thereof.

In addition to the foregoing materials, SSZ-109 can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia.

The relative proportions of SSZ-109 and inorganic oxide matrix may vary widely, with the SSZ-109 content ranging from 1 to 90 wt.% (e.g., 2 to 80 wt. %) of the composite.

EXAMPLES

The following illustrative examples are intended to be non-limiting.

Example 1

Synthesis of Aluminosilicate SSZ-109

14.82 g of deionized water, 0.62 g of a 45% KOH solution, 11.24 g of a 14.24% N,N,N',N'-tetramethyl-N,N'-diisobutylhexane-1,6-diammonium hydroxide solution, 10.0 g of colloidal silica (LUDOX© AS-30) and 0.05 g of hydrated alumina (Reheis F-2000) were mixed together in a Teflon liner. The resulting gel was stirred until it became homogeneous. The liner was then capped and placed within a Parr steel autoclave reactor. The autoclave was then placed in an oven and the heated at 160° C. for 9 days with tumbling (43 rpm). The solid products were recovered by centrifugation, washed with deionized water and dried at 95° C.

Figure 2:
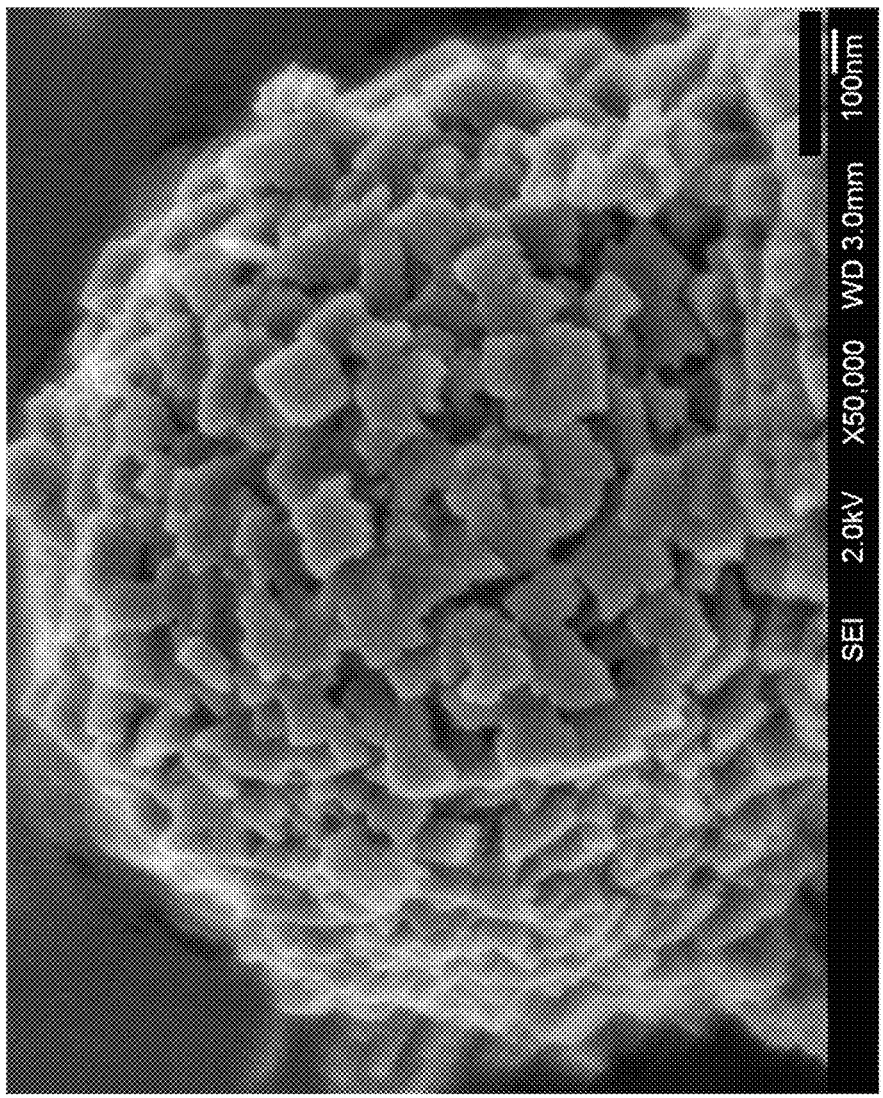
FIG. 2 is a Scanning Electron Micrograph (SEM) image of the as-synthesized molecular sieve of Example 1.

Powder XRD of the as-synthesized product gave the pattern indicated in FIG. 1 and showed the product to be a pure form of a new molecular sieve phase, designated SSZ-109. A SEM image of the as-synthesized product is shown in FIG. 2 indicating a uniform field of crystals.

The product had a $SiO_2/Al_2O_3$ molar ratio of 127.23, as determined by ICP elemental analysis.

Example 2

Synthesis of Aluminosilicate SSZ-109

11.85 g of deionized water, 0.32 g of a 50% NaOH solution, 8.99 g of a 14.24% N,N,N',N'-tetramethyl-N,N'-diisobutylhexane-1,6-diammonium hydroxide solution, 8.0 g of colloidal silica (LUDOX© AS-30) and 0.04 g of hydrated alumina (Reheis F-2000) were mixed together in a Teflon liner. The resulting gel was stirred until it became homogeneous. The liner was then capped and placed within a Parr steel autoclave reactor. The autoclave was then placed in an oven and the heated at 160° C. for 9 days with tumbling (43 rpm). The solid products were recovered by centrifugation, washed with deionized water and dried at 95° C.

Powder XRD showed the product to be pure aluminosilicate SSZ-109 molecular sieve.

Example 3

Synthesis of Aluminosilicate SSZ-109

13.62 g of deionized water, 0.62 g of a 45% KOH solution, 12.50 g of a 13.36% N,N,N',N'-tetramethyl-N-isobutyl-N'-neopentylhexane-1,6-diammonium hydroxide solution, 10.0 g of colloidal silica (LUDOX© AS-30) and 0.05 g of hydrated alumina (Reheis F-2000) were mixed together in a Teflon liner. The resulting gel was stirred until it became homogeneous. The liner was then capped and placed within a Parr steel autoclave reactor. The autoclave was then placed in an oven and the heated at 160° C. for 9 days with tumbling (43 rpm). The solid products were recovered by centrifugation, washed with deionized water and dried at 95° C.

Powder XRD showed the product to be pure aluminosilicate SSZ-109 molecular sieve.

Example 4

Synthesis of Aluminosilicate SSZ-109

8.98 g of deionized water, 0.62 g of a 45% KOH solution, 17.22 g of a 10.11% N,N,N',N'-tetramethyl-N,N'-dineopentylhexane-1,6-diammonium hydroxide solution, 10.0 g of colloidal silica (LUDOX© AS-30) and 0.05 g of hydrated alumina (Reheis F-2000) were mixed together in a Teflon liner. The resulting gel was stirred until it became homogeneous. The liner was then capped and placed within a Parr steel autoclave reactor. The autoclave was then placed in an oven and the heated at 160° C. for 9 days with tumbling (43 rpm). The solid products were recovered by centrifugation, washed with deionized water and dried at 95° C.

Powder XRD showed the product to be pure aluminosilicate SSZ-109 molecular sieve.

Example 5

Synthesis of Aluminosilicate SSZ-109

11.86 g of deionized water, 0.50 g of a 45% KOH solution, 8.99 g of a 14.24% N,N,N',N'-tetramethyl-N,N'-diisobutylhexane-1,6-diammonium hydroxide solution, 8.0 g of colloidal silica (LUDOX© AS-30) and 0.02 g of hydrated alumina (Reheis F-2000) were mixed together in a Teflon liner. The resulting gel was stirred until it became homogeneous. The liner was then capped and placed within a Parr steel autoclave reactor. The autoclave was then placed in an oven and the heated at 160° C. for 9 days with tumbling (43 rpm). The solid products were recovered by centrifugation, washed with deionized water and dried at 95° C.

Powder XRD showed the product to be pure aluminosilicate SSZ-109 molecular sieve.

The product had a $SiO_2/Al_2O_3$ molar ratio of 354.87, as determined by ICP elemental analysis.

Example 6

Synthesis of Aluminosilicate SSZ-109

13.64 g of deionized water, 0.40 g of a 50% NaOH solution, 12.50 g of a 13.36% N,N,N',N'-tetramethyl-N-isobutyl-N'-neopentylhexane-1,6-diammonium hydroxide solution, 10.0 g of colloidal silica (LUDOX© AS-30) and 0.02 g of hydrated alumina (Reheis F-2000) were mixed together in a Teflon liner. The resulting gel was stirred until it became homogeneous. The liner was then capped and placed within a Parr steel autoclave reactor. The autoclave was then placed in an oven and the heated at 160° C. for 9 days with tumbling (43 rpm). The solid products were recovered by centrifugation, washed with deionized water and dried at 95° C.

Powder XRD showed the product to be pure aluminosilicate SSZ-109 molecular sieve.

Example 7

Synthesis of Aluminosilicate SSZ-109

11.85 g of deionized water, 0.16 g of a 50% NaOH solution, 8.99 g of a 14.24% N,N,N',N'-tetramethyl-N,N'-diisobutylhexane-1,6-diammonium hydroxide solution, 8.0 g of colloidal silica (LUDOX© AS-30) and 0.05 g of hydrated alumina (Reheis F-2000) were mixed together in a Teflon liner. The resulting gel was stirred until it became homogeneous. The liner was then capped and placed within a Parr steel autoclave reactor. The autoclave was then placed in an oven and the heated at 160° C. for 9 days with tumbling (43 rpm). The solid products were recovered by centrifugation, washed with deionized water and dried at 95° C.

Powder XRD showed the product to be pure aluminosilicate SSZ-109 molecular sieve.

The as-synthesized product had a $SiO_2/Al_2O_3$ molar ratio of 99.31, as determined by ICP elemental analysis.

Example 8

Synthesis of Aluminosilicate SSZ-109

20.08 g of deionized water, 1.29 g of a 45% KOH solution, 18.13 g of a 14.24% N,N,N',N'-tetramethyl-N,N'-diisobutylhexane-1,6-diammonium hydroxide solution and 5.00 g of CBV760 Y-zeolite powder (Zeolyst International; $SiO_2/Al_2O_3$ molar ratio=60) were mixed together in a Teflon liner. The resulting gel was stirred until it became homogeneous. The liner was then capped and placed within a Parr steel autoclave reactor. The autoclave was then placed in an oven and the heated at 160° C. for 6 days. The solid products were recovered by centrifugation, washed with deionized water and dried at 95° C.

Powder XRD showed the product to be pure aluminosilicate SSZ-109 molecular sieve.

The as-synthesized product had a $SiO_2/Al_2O_3$ molar ratio of 47.72, as determined by ICP elemental analysis.

Example 9

Synthesis of Borosilicate SSZ-109

19.09 g of deionized water, 0.67 g of a 50% NaOH solution, 20.84 g of a 13.36% N,N,N',N'-tetramethyl-N-isobutyl-N'-neopentylhexane-1,6-diammonium hydroxide solution, 5.0 g of fumed silica (CAB-O-SIL® M-5) and 0.10 g of boric acid were mixed together in a Teflon liner. The resulting gel was stirred until it became homogeneous. The liner was then capped and placed within a Parr steel autoclave reactor. The autoclave was then placed in an oven and the heated at 160° C. for 8 days with tumbling (43 rpm). The solid products were recovered by centrifugation, washed with deionized water and dried at 95° C.

Powder XRD showed the product to be pure borosilicate SSZ-109 molecular sieve.

Example 10

Synthesis of All-Silica SSZ-109

8.23 g of deionized water, 18.76 g of a 13.36% N,N,N',N'-tetramethyl-N-isobutyl-N'-neopentylhexane-1,6-diammonium hydroxide solution and 10.0 g of colloidal silica (LUDOX© AS-30) were mixed together in a Teflon liner. The resulting gel was stirred until it became homogeneous. The liner was then capped and placed within a Parr steel autoclave reactor. The autoclave was then placed in an oven and the heated at 160° C. for 16 days with tumbling (43 rpm). The solid products were recovered by centrifugation, washed with deionized water and dried at 95° C.

Powder XRD showed the product to be pure silica SSZ-109 molecular sieve.

Example 11

Calcination of SSZ-109

The as-synthesized molecular sieve of Example 1 was calcined inside a muffle furnace under a flow of air heated to 595° C. at a rate of 1° C./minute and held at 595° C. for 5 hours, cooled and then analyzed by powder XRD.

Figure 3:
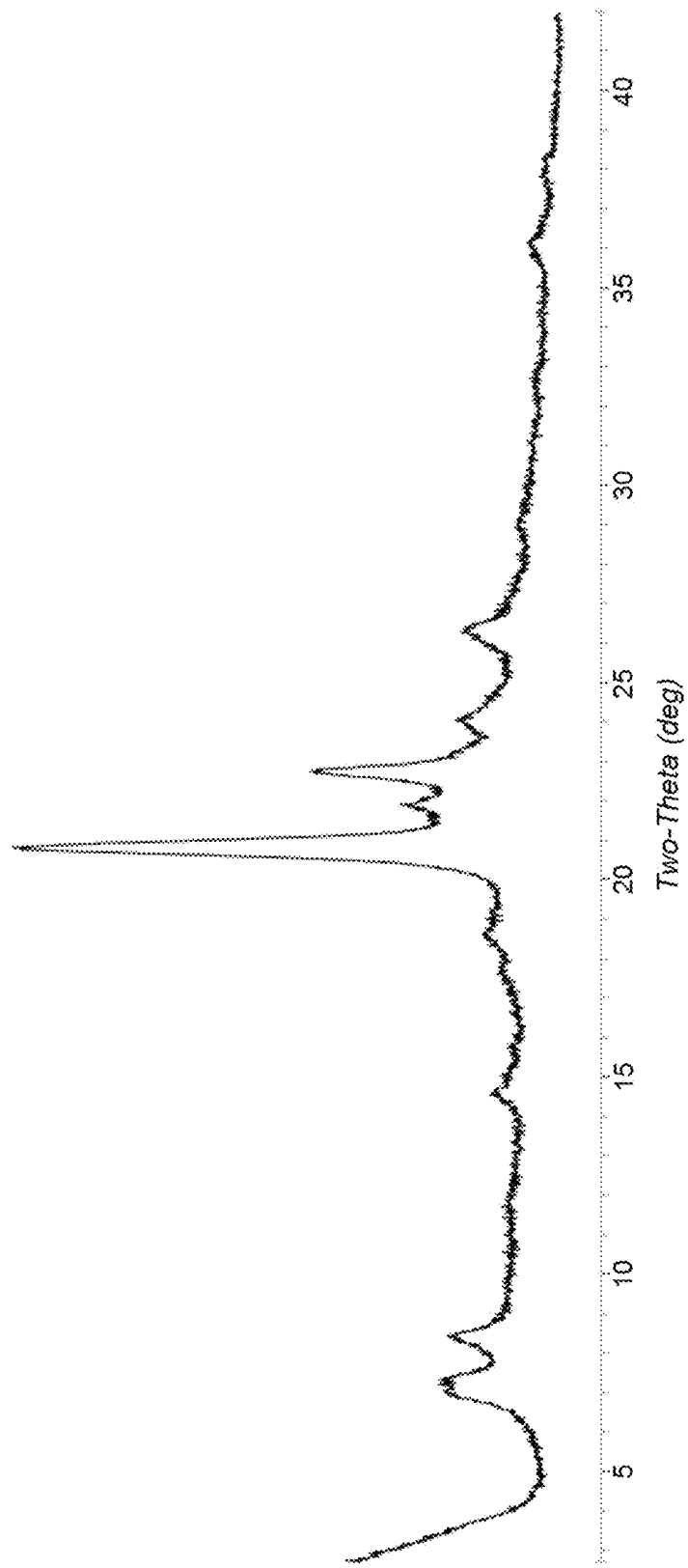
FIG. 3 shows the powder XRD pattern of the calcined molecular sieve of Example 11.

Powder XRD of the calcined product gave the pattern indicated in FIG. 3 and showed the material to be stable after calcination to remove the organic structure directing agent.

Example 12

Micropore Volume Analysis

The calcined molecular sieve material of Example 11 was treated with 10 mL (per g of molecular sieve) of a 1N ammonium nitrate solution at 90° C. for 2 hours. The mixture was cooled, the solvent decanted off and the same process repeated.

After drying, the product ($NH_4$-SSZ-109) was subjected to micropore volume analysis using $N_2$ an adsorbate and via the B.E.T. method. The molecular sieve had a micropore volume of 0.09 $cm^3/g$.

The invention claimed is:

1. A molecular sieve having, in its as-synthesized form, an X-ray diffraction pattern including the peaks listed in the following Table:

| 2-Theta | d-Spacing, nm | Relative Intensity | Peak Broadening |
|---|---|---|---|
| 7.29 ± 0.30 | 1.212 | W | B |
| 8.36 ± 0.30 | 1.056 | W | Sh |
| 14.71 ± 0.30 | 0.602 | W | B |
| 18.45 ± 0.30 | 0.480 | W | B |
| 20.74 ± 0.30 | 0.428 | VS | Sh |
| 21.82 ± 0.30 | 0.407 | W | Sh |
| 22.53 ± 0.30 | 0.394 | VS | Sh |
| 23.92 ± 0.30 | 0.372 | W | B |
| 26.17 ± 0.30 | 0.340 | M | B |
| 28.71 ± 0.30 | 0.311 | W | Sh. |

2. The molecular sieve of claim 1, and having a composition comprising the molar relationship:

| $SiO_2/X_2O_3$ | ≥10 |
|---|---|
| $Q/SiO_2$ | >0 to 0.1 |
| $M/SiO_2$ | 0 to 0.1 | wherein X is a trivalent element; Q comprises one or more of N,N,N',N'-tetramethyl-N,N'-diisobutylhexane-1,6-diammonium cations, N,N,N',N'-tetramethyl-N,N'-dineopentylhexane-1,6-diammonium cations, and N,N,N',N'-tetramethyl-N-isobutyl-N'-neopentylhexane-1,6-diammonium cations; and M is a metal selected from Groups 1 and 2 of the Periodic Table.

3. The molecular sieve of claim 2, wherein the trivalent element (X) comprises one of more of B, Al, Ga, and Fe.

4. The molecular sieve of claim 2, wherein the trivalent element (X) comprises one or more of B and Al.

5. A method of synthesizing the molecular sieve of claim 1, the method comprising:
   (a) preparing a reaction mixture comprising:
      (1) a source of silicon oxide;
      (2) optionally, a source of an oxide of a trivalent element (X);
      (3) optionally, a source of a metal (M) selected from Groups 1 and 2 of the Periodic Table;
      (4) a structure directing agent (Q) comprising one or more of N,N,N',N'-tetramethyl-N,N'-diisobutylhexane-1,6-diammonium cations, N,N,N',N'-tetramethyl-N,N'-dineopentylhexane-1,6-diammonium cations, and N,N,N',N'-tetramethyl-N-isobutyl-N'-neopentylhexane-1,6-diammonium cations;
      (5) a source of hydroxide ions; and
      (6) water; and
   (b) subjecting the reaction mixture to crystallization conditions sufficient to form crystals of the molecular sieve.

6. The method of claim 5, wherein the reaction mixture has a composition, in terms of molar ratios, as follows:

| $SiO_2/X_2O_3$ | ≥10 |
|---|---|
| $M/SiO_2$ | 0 to 0.50 |
| $Q/SiO_2$ | 0.05 to 0.50 |
| $OH/SiO_2$ | 0.01 to 0.60 |
| $H_2O/SiO_2$ | 5 to 60. |

7. The method of claim 5, wherein the reaction mixture has a composition, in terms of molar ratios, as follows:

| $SiO_2/Al_2O_3$ | 20 to 500 |
|---|---|
| $M/SiO_2$ | 0.0.01 to 0.20 |
| $Q/SiO_2$ | 0.10 to 0.25 |
| $OH/SiO_2$ | 0.20 to 0.40 |
| $H_2O/SiO_2$ | 20 to 40. |

8. The method of claim 5, wherein the trivalent element (X) comprises one of more of B, Al, Ga, and Fe.

9. The method of claim 5, wherein the trivalent element (X) comprises one or more of B and Al.

10. The method of claim 5, wherein the crystallization conditions include a temperature of from 125° C. to 200° C.

11. A molecular sieve having, in its calcined form, an X-ray diffraction pattern including the peaks listed in the following Table:

| 2-Theta | d-Spacing, nm | Relative Intensity | Peak Broadening |
|---|---|---|---|
| 7.21 ± 0.30 | 1.225 | M | B |
| 8.43 ± 0.30 | 1.048 | W | Sh |
| 14.54 ± 0.30 | 0.609 | W | B |
| 18.62 ± 0.30 | 0.476 | W | B |
| 20.80 ± 0.30 | 0.427 | VS | Sh |
| 21.90 ± 0.30 | 0.405 | W | Sh |
| 22.74 ± 0.30 | 0.391 | M | Sh |
| 24.02 ± 0.30 | 0.370 | W | B |
| 26.34 ± 0.30 | 0.338 | M | B |
| 29.01 ± 0.30 | 0.308 | W | B. |

12. The molecular sieve of claim 11, and having a composition comprising the molar relationship:

$X_2O_3$: (n)$SiO_2$ wherein X is a trivalent element; and n is at least 10.

13. The molecular sieve of claim 12, wherein X comprises one of more of B, Al, Ga, and Fe.

14. The molecular sieve of claim 12, wherein X comprises one or more of B and Al.

15. A process for converting a feedstock comprising an organic compound to a conversion product, the process comprising contacting the feedstock at organic compound conversion conditions with a catalyst comprising an active form of the molecular sieve of claim 1.

\* \* \* \* \*